(12) United States Patent
Zhou et al.

(10) Patent No.: US 11,831,264 B2
(45) Date of Patent: Nov. 28, 2023

(54) POWER SUPPLY SYSTEM OF MOTOR CONTROL MODULE AND VEHICLE

(71) Applicant: Huawei Digital Power Technologies Co., Ltd., Shenzhen (CN)

(72) Inventors: Yuan Zhou, Shenzhen (CN); Bucheng Ji, Shenzhen (CN); Xing Zhang, Dongguan (CN); Zhengqiang Zhang, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/703,810

(22) Filed: Mar. 24, 2022

(65) Prior Publication Data

US 2022/0216817 A1 Jul. 7, 2022

(30) Foreign Application Priority Data

Mar. 27, 2021 (CN) .......................... 202110329169.1

(51) Int. Cl.
*H02P 27/08* (2006.01)
*H02M 7/5387* (2007.01)

(52) U.S. Cl.
CPC ........ *H02P 27/08* (2013.01); *H02M 7/53871* (2013.01)

(58) Field of Classification Search
CPC .......... H02P 6/28; H02P 29/027; H02P 27/08; H02M 1/0006; H02M 1/325; H02M 1/10; H02M 7/53871; H02M 7/5387; B60L 3/0092; B60L 3/0046; Y02T 10/72
See application file for complete search history.

(56) References Cited

U.S. PATENT DOCUMENTS

| | | | |
|---|---|---|---|
| 2015/0048767 A1* | 2/2015 | Takezawa | H02P 6/14 327/109 |
| 2018/0331616 A1* | 11/2018 | Hirakata | H03K 17/687 |
| 2019/0173373 A1* | 6/2019 | Zhou | H02M 1/36 |

FOREIGN PATENT DOCUMENTS

| | | |
|---|---|---|
| CN | 102025189 A | 4/2011 |
| CN | 107710589 A | 2/2018 |
| CN | 207910678 U | 9/2018 |
| DE | 20205813 U1 | 2/2003 |
| JP | 2007236134 A | 9/2007 |

\* cited by examiner

*Primary Examiner* — Said Bouziane
(74) *Attorney, Agent, or Firm* — WOMBLE BOND DICKINSON (US) LLP

(57) ABSTRACT

This application provides a power supply system for a motor control module and a vehicle. The power supply system includes a first current limiting unit and an isolation unit. An output end of a first direct current power supply is coupled to a first input end of the isolation unit to form a first power supply loop with the isolation unit. A first output end of a second direct current power supply is coupled to one end of the first current limiting unit. Another end of the first current limiting unit is coupled to a second input end of the isolation unit to form a second power supply loop with the isolation unit. The second power supply loop is connected in parallel to the first power supply loop.

20 Claims, 5 Drawing Sheets

POWER SUPPLY SYSTEM OF MOTOR CONTROL MODULE AND VEHICLE

CROSS-REFERENCE TO RELATED APPLICATION

This application claims priority to Chinese Patent Application No. 202110329169.1, filed on Mar. 27, 2021, which is hereby incorporated by reference in its entirety.

TECHNICAL FIELD

This application relates to the field of power supply technologies, and in particular, to a power supply system of a motor control module and a vehicle.

BACKGROUND

FIG. 1 is a diagram of partial architecture of a motor control module in the conventional technologies. As shown in FIG. 1, the motor control module includes a pulse width modulation (PWM) generator and an inverter. The PWM generator outputs a PWM wave to the inverter. Based on the PWM wave, the inverter converts a direct current into an alternating current and outputs the alternating current to a motor, to control the motor to rotate/stop.

It may be understood that a prerequisite for normal operation of the PWM generator is that power is supplied to the PWM generator. If a power supply system of the motor control module is suddenly faulty, for example, any power supply loop in the power supply system has an excessively large current, the power supply system cannot normally supply power to the PWM generator. As a result, the motor is uncontrollable, the motor suddenly stops, and the like. In addition, this may further cause an irreversible damage to the motor. Therefore, a requirement of the motor control module for the power supply system is that, even when any power supply loop in the power supply system has an excessively large current, the power supply system can still supply power to the motor control module, so that the motor control module can actively control a short circuit of the motor when power is supplied, to avoid a sudden stop of the motor.

SUMMARY

This application provides a power supply system of a motor control module and a vehicle. Even when any power supply loop has an excessively large current, the power supply system can still supply power to the motor control module, so that the motor control module can actively control a short circuit of a motor when power is supplied, to avoid a sudden stop of the motor.

According to a first aspect, an embodiment of this application provides a power supply system of a motor control module. The power supply system is disposed between the motor control module and at least two direct current power supplies. The at least two direct current power supplies include a first direct current power supply and a second direct current power supply. The power supply system includes a first current limiting unit and an isolation unit. The isolation unit is configured to output a voltage to the motor control module.

An output end of the first direct current power supply is coupled to a first input end of the isolation unit to form a first power supply loop.

A first output end of the second direct current power supply is coupled to one end of the first current limiting unit. The other end of the first current limiting unit is coupled to a second input end of the isolation unit to form a second power supply loop. The second power supply loop is connected in parallel to the first power supply loop. The first current limiting unit is configured to disconnect the second power supply loop when a loop current of the first power supply loop is greater than a first preset current threshold.

A second output end of the second direct current power supply is coupled to the motor control module. When the second power supply loop is disconnected, the second direct current power supply is configured to supply power to the motor control module to form a third power supply loop.

In this embodiment of this application, when the loop current of the first power supply loop is greater than the first preset current threshold, the first current limiting unit may disconnect the second power supply loop, to avoid that the second direct current power supply is affected by the loop current of the first power supply loop. In addition, the second direct current power supply may supply power to the motor control module by using the third power supply loop. In this embodiment of this application, even when the first power supply loop in the power supply system has an excessively large current (for example, greater than the first preset current threshold), the power supply system can still supply power to the motor control module (that is, the second direct current power supply supplies power to the motor control module by using the third power supply loop), so that the motor control module can actively control a short circuit of the motor when power is supplied, to avoid a sudden stop of the motor, which is highly secure.

In an embodiment, the power supply system further includes an alternating current conversion unit, a first transformer, a second transformer, and a second current limiting unit.

An output end of the isolation unit is coupled to an input end of the alternating current conversion unit.

An output end of the alternating current conversion unit is separately coupled to an input end of the first transformer and an input end of the second transformer, and is configured to: convert a direct current voltage output by the isolation unit into an alternating current voltage, and transmit the alternating current voltage separately to the first transformer and the second transformer. The first transformer and the second transformer are configured to separately transmit a voltage to the motor control module.

The input end of the second transformer is further coupled to the second current limiting unit. The second current limiting unit is configured to disconnect the second transformer from the alternating current conversion unit when a loop current of the third power supply loop is greater than a second preset current threshold.

In this embodiment of this application, even if the third power supply loop has an excessively large current (for example, greater than the second preset current threshold), the first direct current power supply supplies power to the first PWM generator by using the first power supply loop. When power is supplied, the first PWM generator can control all three IGBTs connected in parallel in a second part of an inverter to be conducted.

In an embodiment, the motor control module includes a first pulse width modulation (PWM) generator, a second PWM generator, and an inverter. The inverter includes a first part and a second part. Each part includes three insulated gate bipolar transistors IGBTs connected in parallel. The three IGBTs connected in parallel in the first part are respectively connected in series to the three IGBTs connected in parallel in the second part to form a three-phase full-bridge converter.

The first PWM generator is configured to control all the three IGBTs connected in parallel in the first part to be conducted. The second PWM generator is configured to control all the three IGBTs connected in parallel in the second part to be conducted.

In an embodiment, the power supply system further includes a rectifier unit. An output end of the first transformer and an output end of the second transformer are separately coupled to the motor control module by using the rectifier unit.

In an embodiment, the power supply system further includes an alternating current conversion controller, configured to control a voltage amplitude of the alternating current voltage obtained through conversion performed by the alternating current conversion unit.

In an embodiment, the isolation unit includes a first diode and a second diode. A cathode of the first diode is connected to a cathode of the second diode to form an output end of the isolation unit. The first input end of the isolation unit is an anode of the first diode. The second input end of the isolation unit is the cathode of the second diode.

In this embodiment of this application, the first direct current power supply and the second direct current power supply are isolated by using unidirectional conductivity of a diode. In this way, the costs are relatively low.

In an embodiment, the isolation unit includes a first field effect transistor and a second field effect transistor. A source of the first field effect transistor is connected to a source of the second field effect transistor to form the output end of the isolation unit. The first input end of the isolation unit is a drain of the first field effect transistor. The second input end of the isolation unit is a drain of the second field effect transistor.

In an embodiment, the first direct current power supply is a battery. The second direct current power supply includes a step-down unit and a power battery. The power battery is coupled to an input end of the step-down unit. A first output end of the step-down unit is coupled to the first output end of the second direct current power supply. A second output end of the step-down unit is coupled to the second output end of the second direct current power supply.

In an embodiment, the power supply system further includes a voltage regulator unit. The voltage regulator unit is configured to regulate an output voltage of the isolation unit.

According to a second aspect, an embodiment of this application provides a vehicle. The vehicle includes a power battery, a battery, a motor control module, a motor, and the power supply system according to the first aspect or any embodiment of the first aspect. A first direct current power supply includes the battery. A second direct current power supply includes the power battery.

It should be understood that implementation and beneficial effects of the foregoing aspects of this application may be referred to each other.

DESCRIPTION OF EMBODIMENTS

The following clearly describes the technical solutions in embodiments of this application with reference to the accompanying drawings in embodiments of this application. Clearly, the described embodiments are some but not all of embodiments of this application. All other embodiments obtained by a person of ordinary skill in the art based on embodiments of this application without creative efforts shall fall within the protection scope of this application.

The technical solutions of this application are further described below in detail with reference to the accompanying drawings.

Figure 2:
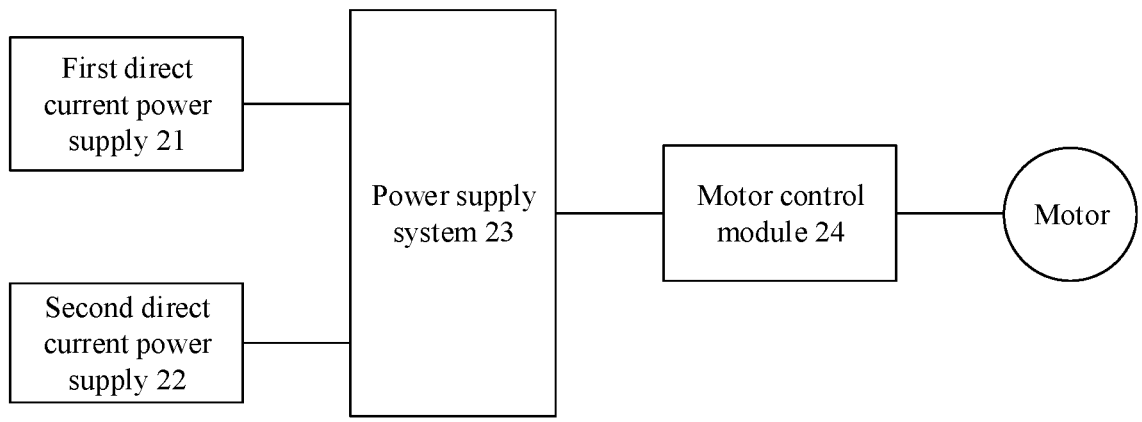
FIG. 2 is a block diagram of application of a power supply system of a motor control module according to an embodiment of this application.

This embodiment of this application may be applied to a use scenario of a motor. FIG. 2 is a block diagram of application of a power supply system of a motor control module according to an embodiment of this application. As shown in FIG. 2, a power supply system 23 is disposed between a motor control module 24 and at least two direct current power supplies. The at least two direct current power supplies include a first direct current power supply 21 and a second direct current power supply 22. In other words, an output end of the first direct current power supply 21 and an output end of the second direct current power supply 22 are coupled to one side of the power supply system 23. The other side of the power supply system 23 is coupled to the motor control module 24. The motor control module 24 may control a motor to rotate/stop.

It should be noted that "coupling" described in this application indicates direct or indirect connection. For example, coupling between A and B may be direct connection between A and B, or may be indirect connection between A and B by using one or more other electronic components. For example, A is directly connected to C, and C is directly connected to B, so that A is connected to B by using C.

The first direct current power supply 21 and/or the second direct current power supply 22 may be, for example, a power battery (such as a Ni—Cd battery, a Ni-MH battery, a lithium-ion battery, or a lithium polymer battery) or a battery. For example, the first direct current power supply 21 is a battery, and the second direct current power supply 22 is a power battery. A battery voltage of the battery is lower than a battery voltage of the power battery. In an embodiment, the first direct current power supply 21 and/or the second direct current power supply 22 may be configured to couple an upper-level circuit such as an AC/DC converter (Alternating Current/Direct-Current converter) or another DC/DC converter (such as a BUCK converter, a BOOST converter, or a BUCK-BOOST converter). In other words, the first direct current power supply 21 and/or the second direct current power supply 22 may be a direct power supply, or may be an indirect power supply after transmission by using a circuit.

The power supply system 23 may supply power to the motor control module 24. Power input of the power supply system 23 comes from the first direct current power supply 21 or the second direct current power supply 22. In an embodiment, the power supply system 23 may amplify a voltage output by the first direct current power supply 21 or the second direct current power supply 22, and transmit the amplified voltage to the motor control module 24.

Figure 1:
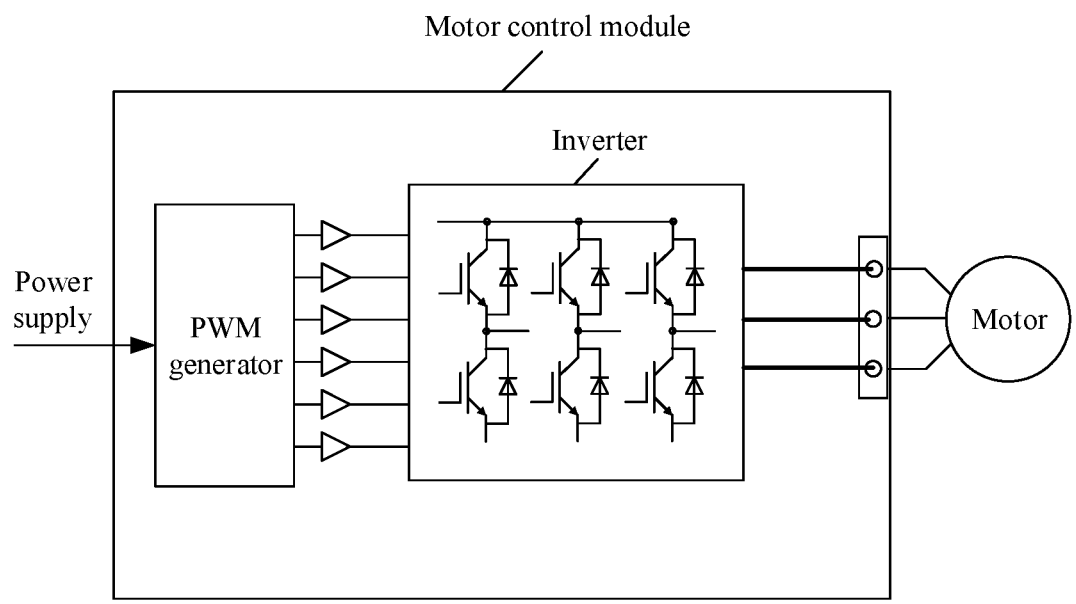
FIG. 1 is a diagram of partial architecture of a conventional motor control module.

For details of the motor control module 24, refer to FIG. 1. The motor control module 24 includes a PWM generator and an inverter shown in FIG. 1. The inverter may convert a direct current into an alternating current, and transmit the alternating current to the motor to control the motor to rotate. For example, the motor may be located in a vehicle. Therefore, the power supply system 23 in this embodiment of this application may be understood as a power supply system of the vehicle.

The following describes a specific structure of the power supply system provided in this embodiment of this application with reference to the accompanying drawings.

Figure 3:
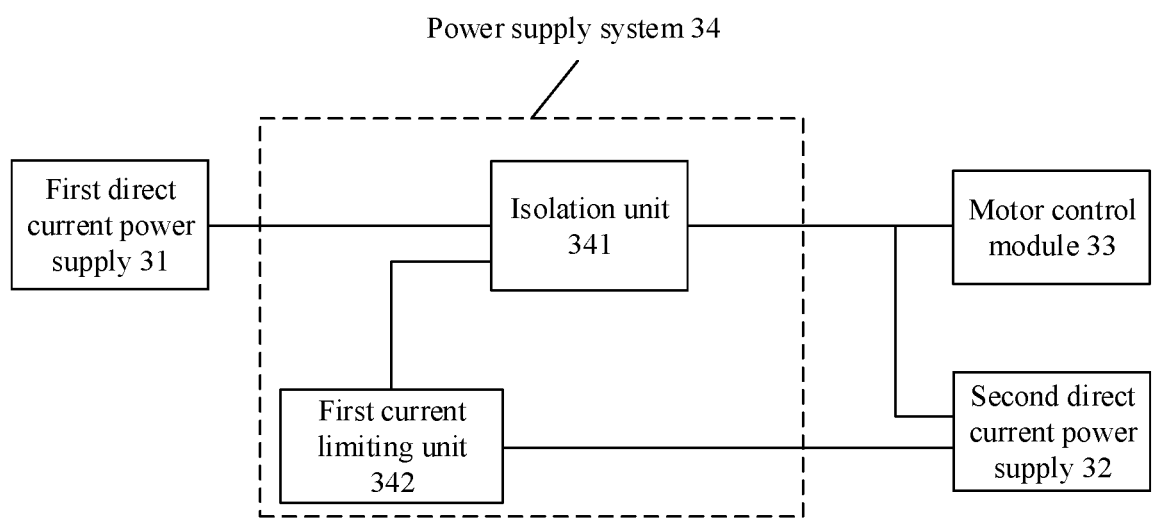
FIG. 3 is a block diagram of a structure of a power supply system of a motor control module according to an embodiment of this application.

FIG. 3 is a block diagram of a structure of a power supply system of a motor control module according to an embodiment of this application. As shown in FIG. 3, a power supply system 34 is disposed between a motor control module 33 and at least two direct current power supplies. The at least two direct current power supplies include a first direct current power supply 31 and a second direct current power supply 32. The power supply system 34 includes an isolation unit 341 and a first current limiting unit 342. The isolation unit 341 may output a voltage to the motor control module 33.

The isolation unit 341 includes a first input end and a second input end. An output end of the first direct current power supply 31 is coupled to the first input end of the isolation unit 341 to form a first power supply loop. A first output end of the second direct current power supply 32 is coupled to one end of the first current limiting unit 342. The other end of the first current limiting unit 342 is coupled to the second input end of the isolation unit 341 to form a second power supply loop. The second power supply loop is connected in parallel to the foregoing first power supply loop.

In some embodiments, an output voltage of the first direct current power supply 31 is higher than an output voltage of the second direct current power supply 32. For example, the first direct current power supply 31 is a battery, and the second direct current power supply 32 may include a power battery and a step-down unit. The power battery is coupled to an input end of the step-down unit. A first output end of the step-down unit is coupled to the first output end of the second direct current power supply 32. In an embodiment, if the output voltage of the first direct current power supply 31 is not higher than the output voltage of the first output end of the second direct current power supply 32, the second direct current power supply 32 supplies power to the motor control module 33 by using the second power supply loop. Otherwise, the first direct current power supply 31 supplies power to the motor control module 33 by using the first power supply loop. In other words, the second direct current power supply 32 may be understood as a backup power supply of the first direct current power supply 31.

If a loop current of the first power supply loop is greater than a first preset current threshold, the first direct current power supply 31 cannot supply power to the motor control module 33 by using the first power supply loop, and the loop current of the first power supply loop may cause a damage to the second direct current power supply 32. In this case, the first current limiting unit 342 may disconnect the second power supply loop, to avoid an impact of the loop current of the first power supply loop on the second direct current power supply 32. In an embodiment, that the loop current of the first power supply loop is greater than the first preset current threshold may be caused due to a short circuit of any electronic component (such as a capacitor or a resistor) in the first power supply loop. The first preset current threshold may be a preset fixed value, and is related to a component parameter of an electronic component used in the first power supply loop and/or a system temperature of a power supply system.

The second output end of the second direct current power supply 32 is coupled to the motor control module 33. When the second power supply loop is disconnected, the second direct current power supply 32 may supply power to the motor control module 33 to form a third power supply loop.

In this embodiment of this application, when the loop current of the first power supply loop is greater than the first preset current threshold, the first current limiting unit may disconnect the second power supply loop, to avoid that the second direct current power supply is affected by the loop current of the first power supply loop. In addition, the second direct current power supply may supply power to the motor control module by using the third power supply loop. In this embodiment of this application, even when the first power supply loop in the power supply system has an excessively large current (for example, greater than the first preset current threshold), the power supply system can still supply power to the motor control module (that is, the second direct current power supply supplies power to the motor control module by using the third power supply loop), so that the motor control module can actively control a short circuit of the motor when power is supplied, to avoid a sudden stop of the motor, which is highly secure.

Figure 4:
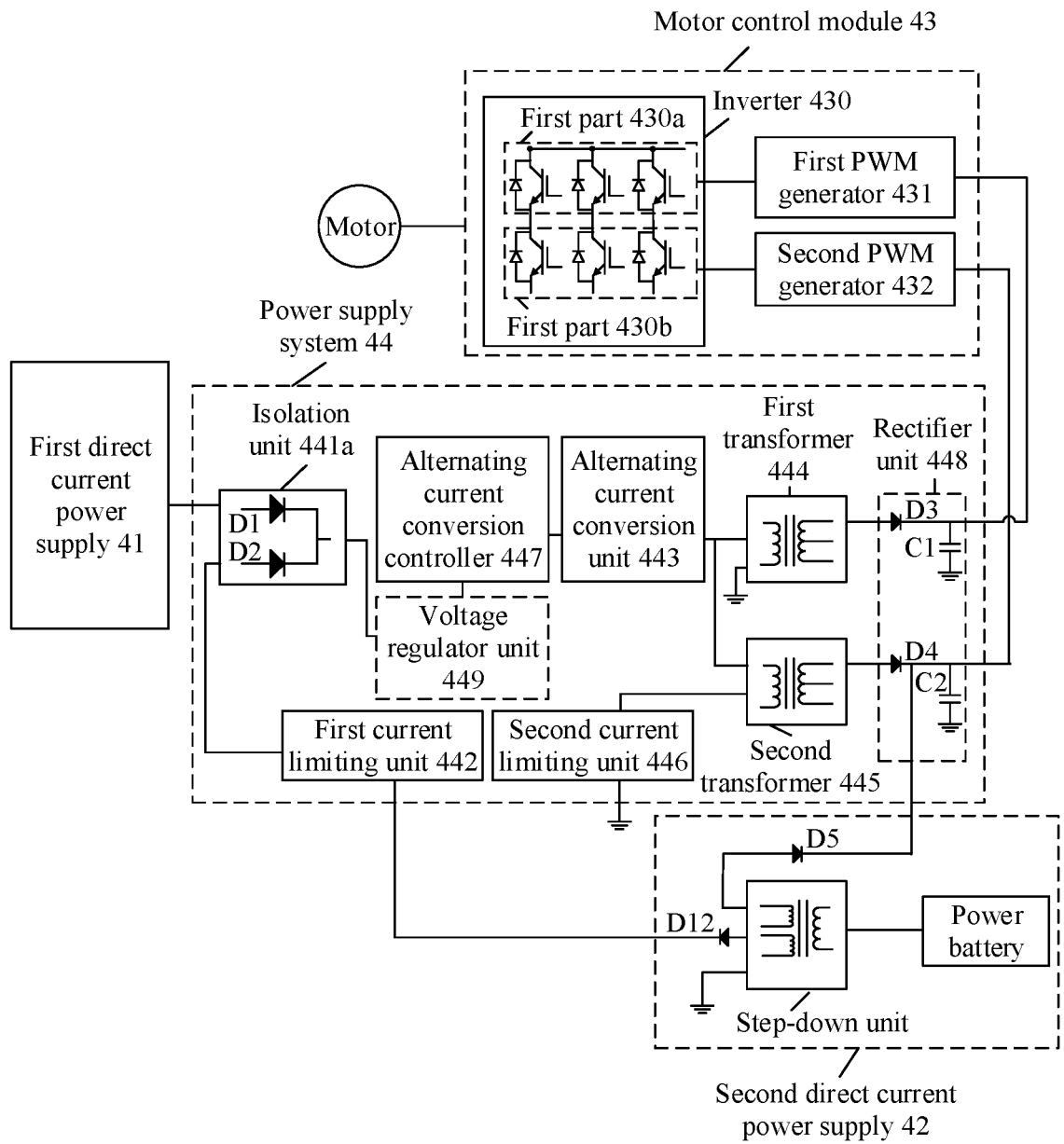
FIG. 4 is another block diagram of a structure of a power supply system of a motor control module according to an embodiment of this application.

FIG. 4 is another block diagram of a structure of a power supply system of a motor control module according to an embodiment of this application. As shown in FIG. 4, a power supply system 44 is disposed between a motor control module 43 and at least two direct current power supplies. The at least two direct current power supplies include a first direct current power supply 41 and a second direct current power supply 42. In addition to an isolation unit 441a and a first current limiting unit 442, the power supply system 44 further includes an alternating current conversion unit 443, a first transformer 444, a second transformer 445, and a second current limiting unit 446.

To better understand this embodiment of this application, an example of the motor control module 43 is first described. The motor control module 43 includes an inverter 430, a first PWM generator 431, and a second PWM generator 432 shown in FIG. 4. The inverter 430 includes a first part 430a and a second part 430b. Each part includes three insulated gate bipolar transistors IGBTs connected in parallel. The three IGBTs connected in parallel in the first part 430a are respectively connected in series to the three IGBTs connected in parallel in the second part 430b to form three phase circuits (that is, three bridge arms).

In this embodiment of this application, for example, an upper bridge arm of each phase circuit is the first part 430a, and a lower bridge arm of each phase circuit is the second part 430b. An output end of the first PWM generator 431 is coupled to the first part 430a of the inverter 430, and an output end of the second PWM generator 432 is coupled to the second part 430b of the inverter 430. An output end of the motor control module 43 is coupled to a motor. That the motor control module 43 actively controls a short circuit of the motor may be understood as follows: The first PWM generator 431 controls all the three IGBTs connected in parallel in the first part 430a to be conducted, or the second PWM generator 432 controls all the three IGBTs connected in parallel in the second part 430b to be conducted.

In an embodiment, a lower bridge arm of each phase circuit may be used as a first part, and an upper bridge arm of each phase circuit may be used as a second part (not shown in the figure).

The two parts in the inverter 430 respectively correspond to two PWM generators. One PWM generator corresponds to one transformer. In this embodiment of this application, when any power supply loop in the power supply system 44 has an excessively large current, any one of the two transformers may have voltage output. If the first transformer 444 may have voltage output, the first PWM generator 431 may control all the three IGBTs connected in parallel in the first part 430a to be conducted, and actively control a short circuit of the motor. If the second transformer 445 may have voltage output, the second PWM generator 432 may control all the three IGBTs connected in parallel in the second part 430b to be conducted, and actively control a short circuit of the motor.

In some embodiments, the isolation unit 441a includes a first input end and a second input end. An output end of the first direct current power supply 41 is coupled to the first input end of the isolation unit 441a to form a first power supply loop with the isolation unit 441a. A first output end of the second direct current power supply 42 is coupled to one end of the first current limiting unit 442. The other end of the first current limiting unit 442 is coupled to the second input end of the isolation unit 441a to form a second power supply loop with the isolation unit 441a. The first current limiting unit 442 may disconnect the isolation unit 441a from the second direct current power supply 42 when a loop current of the first power supply loop is greater than a first preset current threshold, to avoid a damage caused by the loop current of the first power supply loop to the second direct current power supply 32. In this case, the second direct current power supply 42 may supply power to the second PWM generator 432 by using the third power supply loop.

For example, the first direct current power supply 41 is a battery, and the second direct current power supply 42 may include a power battery and a step-down unit. The step-down unit reduces a battery voltage of the power battery, and transmits the reduced voltage to the first output end/the second output end of the second direct current power supply 42. A first output end of the step-down unit is coupled to the first output end of the second direct current power supply 42. A second output end of the step-down unit is coupled to the second output end of the second direct current power supply 42. The first output end and the second output end of the step-down unit may be, for example, two output ends in a multi-winding transformer. The two output ends output different magnitudes of voltages. The first output end of the second direct current power supply 42 is coupled to the isolation unit 441a, and the second output end of the second direct current power supply 42 is coupled to a power end of the second PWM generator 432. For example, a voltage output by the second output end of the second direct current power supply 42 is greater than a voltage output by the first output end of the second direct current power supply 42.

In an embodiment, the step-down unit may be coupled to the second output end of the second direct current power supply 42 by using a fifth diode D5. The fifth diode D5 has unidirectional conductivity, so that the step-down unit can output a voltage to the second direct current power supply 42, to prevent another current from flowing back to the second direct current power supply 42. Likewise, the step-down unit may be coupled to the first output end of the second direct current power supply 42 by using a diode D12, so that the step-down unit can output a voltage to the second direct current power supply 42, to prevent a current from flowing back to the second direct current power supply 42 from the first current limiting unit 442.

In this embodiment of this application, even if the first power supply loop has an excessively large current (for example, greater than the first preset current threshold), the second direct current power supply supplies power to the second PWM generator by using the third power supply loop. When power is supplied, the second PWM generator can control all the three IGBTs connected in parallel in the second part of the inverter to be conducted.

In some embodiments, an output end of the isolation unit 441a is coupled to an input end of the alternating current conversion unit 443, an output end of the alternating current conversion unit 443 is separately coupled to an input end of the first transformer 444 and an input end of the second transformer 445, and the alternating current conversion unit 443 converts a direct current voltage of the isolation unit 441a into an alternating current voltage, and transmits the alternating current voltage separately to the first transformer 444 and the second transformer 445.

For example, the power supply system 44 may further include a rectifier unit 448. An output end of the first transformer 444 and an output end of the second transformer 445 are separately coupled to the motor control module 43 by using the rectifier unit 448. For example, the rectifier unit 448 is a half-wave rectifier. The rectifier unit 448 includes a third diode D3 and a fourth diode D4. An anode of the third diode D3 is coupled to the output end of the first transformer 444, and a cathode of the third diode D3 is coupled to a power end of the first PWM generator 431, to rectify an output voltage of the first transformer 444 and transmit the rectified direct current to the first PWM generator 431. An anode of the fourth diode D4 is coupled to the output end of the second transformer 445, and a cathode of the fourth diode D4 is coupled to a power end of the second PWM generator 432, to rectify an output voltage of the second transformer 445 and transmit the rectified direct current to the second PWM generator 432. In an embodiment, the rectifier unit 448 may further include a first capacitor C1 and a second capacitor C2. The first capacitor C1 may filter a rectified voltage of the third diode D3. Likewise, the second capacitor C2 may filter a rectified voltage of the fourth diode D4.

Further, the input end of the second transformer 445 is further coupled to the second current limiting unit 446. When the loop current of the third power supply loop is greater than a second preset current threshold, the second direct current power supply 42 cannot supply power to the second PWM generator 432 by using the third power supply loop, and the loop current of the third power supply loop may cause a damage to the second direct current power supply 42. In this case, the second current limiting unit 446 may disconnect the second transformer 445 from the alternating current conversion unit 443, to avoid an impact of the loop current of the third power supply loop on the alternating current conversion unit 443 and ensure that the first direct current power supply 41 can supply power to the first PWM generator 431 by using the isolation unit 441a, the alternating current conversion unit 443, and the first transformer 444.

In this embodiment of this application, even if the third power supply loop has an excessively large current (for example, greater than the second preset current threshold), the first direct current power supply supplies power to the first PWM generator by using the first power supply loop. When power is supplied, the first PWM generator can control all the three IGBTs connected in parallel in the second part of the inverter to be conducted.

In an embodiment, that the loop current of the third power supply loop is greater than the second preset current threshold may be caused due to a short circuit of any electronic component (such as a capacitor or a resistor) in the third power supply loop. The second preset current threshold may be a preset fixed value, and is related to a component parameter of an electronic component used in the third power supply loop and/or a system temperature of a power supply system.

In some embodiments, the power supply system 44 further includes an alternating current conversion controller 447, configured to control a voltage amplitude of the alternating current voltage obtained through conversion performed by the alternating current conversion unit 443. In this case, the alternating current conversion unit 443 may convert a direct current into an alternating current, and may further perform power amplification on the direct current. The alternating current conversion unit 443 includes at least one switch transistor. The alternating current conversion controller 447 controls conduction duration of the switch transistor in the alternating current conversion unit 443, to control the voltage amplitude of the alternating current voltage output by the alternating current conversion unit 443.

For example, the alternating current conversion controller 447 may be a central processing unit (CPU), another general purpose processor, a digital signal processor (DSP), an application-specific integrated circuit (ASIC), a field programmable gate array (FPGA), another programmable logic device, a discrete gate, a transistor logic device, a discrete hardware component, or the like.

In some embodiments, the power supply system 44 further includes a voltage regulator unit 449, configured to regulate an output voltage of the isolation unit 441a. The voltage regulator unit 449 may be a circuit module formed through connection among individual electronic components, or the voltage regulator unit 449 may be an integrated voltage regulator. This embodiment of this application sets no limitation on a specific representation form of the voltage regulator unit 449. In this embodiment of this application, power provided by the first direct current power supply 41 or the second direct current power supply 42 to the motor control module 43 can be regulated, to facilitate stable operation of the power supply system and further improve reliability of the power supply system.

In conclusion, in this embodiment of this application, when the loop current of the first power supply loop in the power supply system is greater than the first preset current threshold, the second direct current power supply supplies power to the second PWM generator by using the third power supply loop. In this case, a capability that the second PWM generator controls all the three IGBTs connected in parallel in the second part of the inverter to be conducted is reserved. When the loop current of the third power supply loop in the power supply system is greater than the second preset current threshold, the first direct current power supply supplies power to the first PWM generator by using the first power supply loop. In this case, a capability that the first PWM generator controls all the three IGBTs connected in parallel in the first part of the inverter to be conducted is reserved. It should be noted that this embodiment of this application may resolve a case in which the loop current of the first power supply loop is greater than the first preset current threshold or the loop current of the second power supply loop is greater than the second preset current threshold. In other words, it may be understood that this embodiment of this application may resolve a case in which a single point of failure occurs in the power supply system. When any single point of failure occurs in the power supply system, the power supply system provided in this embodiment of this application may reserve the capability that any generator controls all the three IGBTs connected in parallel in any part of the inverter to be conducted, to actively control a short circuit of the motor and avoid a sudden stop of the motor, which is highly secure.

In some embodiments, the isolation unit 441a may be shown in FIG. 4 and include a first diode D1 and a second diode D2. A cathode of the first diode D1 is connected to a cathode of the second diode D2 to form an output end of the isolation unit 441a. The first input end of the isolation unit 441a is an anode of the first diode D1. The second input end of the isolation unit 441a is the cathode of the second diode D2. In this embodiment of this application, the first direct current power supply 41 and the second direct current power supply 42 are isolated by using unidirectional conductivity of a diode. In this way, the costs are relatively low.

Figure 5:
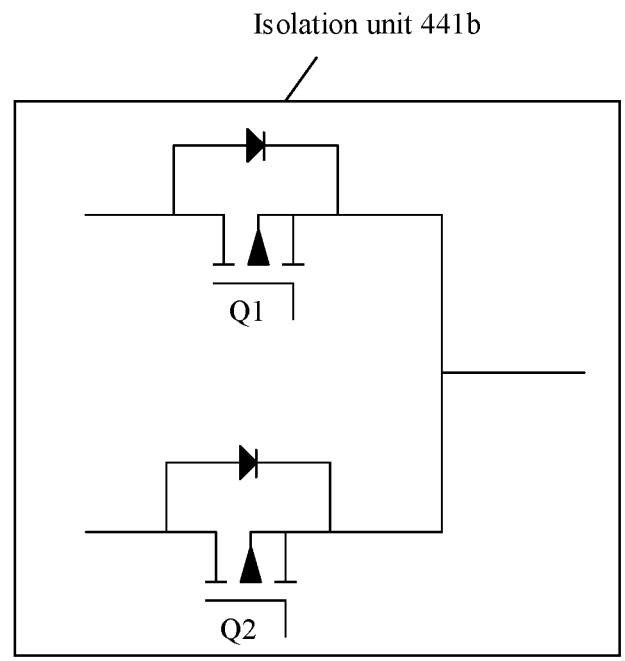
FIG. 5 is a circuit diagram of an isolation unit according to an embodiment of this application.

In some embodiments, FIG. 5 is a circuit diagram of an isolation unit according to an embodiment of this application. As shown in FIG. 5, the isolation unit 441a shown in FIG. 4 may be replaced with an isolation unit 441b shown in FIG. 5. In an embodiment, the isolation unit 441b includes a first field effect transistor Q1 and a second field effect transistor Q2. A source of the first field effect transistor Q1 is connected to a source of the second field effect transistor Q2 to form an output end of the isolation unit 441b. A first input end of the isolation unit 441b is a drain of the first field effect transistor Q1. A second input end of the isolation unit 441b is a drain of the second field effect transistor Q2. Further, a gate of the first field effect transistor Q1 and that of the second field effect transistor Q2 may be further coupled to a controller. The controller may be an alternating current conversion controller, or may be another controller, provided that the controller can control conduction of the field effect transistor. The first field effect transistor Q1 may be conducted when the first direct current power supply supplies power to the motor control module by using the first power supply loop. The second field effect transistor may be conducted when the second direct current power supply supplies power to the motor control module by using the second power supply loop. A component loss caused when the field effect transistor is conducted is less than a component loss caused when a diode is conducted. In this embodiment of this application, a system loss may be reduced.

Figure 6:
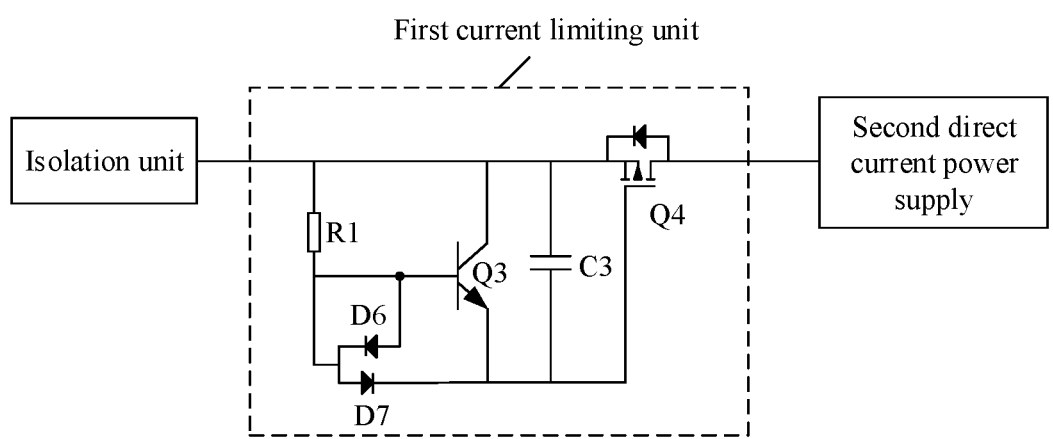
FIG. 6 is a circuit diagram of a first current limiting unit according to an embodiment of this application.
Figure 7:
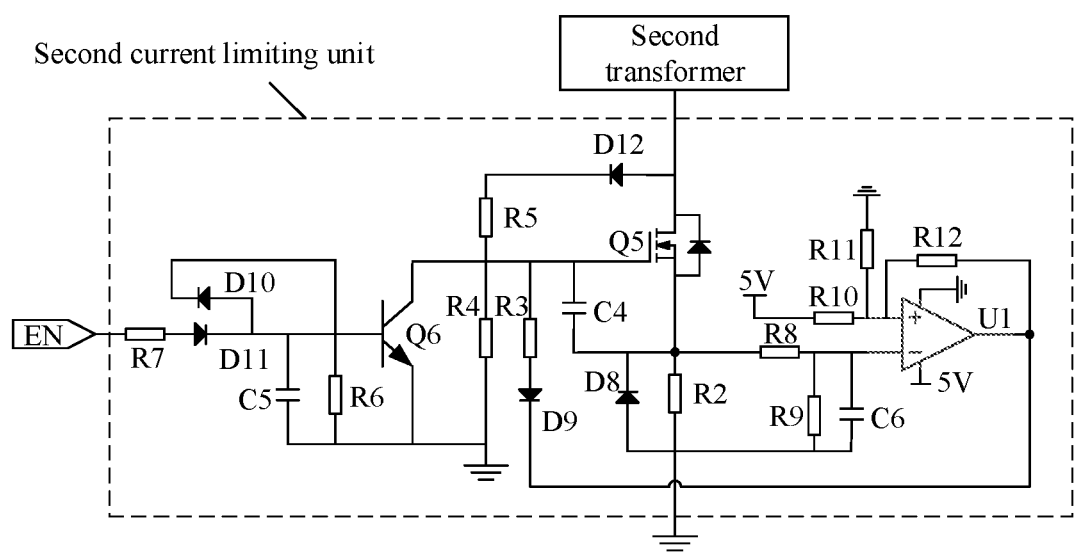
FIG. 7 is a circuit diagram of a second current limiting unit according to an embodiment of this application.

With reference to FIG. 6 and FIG. 7, the following describes an example of a specific circuit diagram of a first current limiting unit provided in embodiments of this application.

FIG. 6 is a circuit diagram of a first current limiting unit according to an embodiment of this application. As shown in FIG. 6, the first current limiting unit includes a first resistor R1, a first triode Q3, and a third field effect transistor Q4. One end of the first resistor R1 is coupled to an output end of an isolation unit, a collector of the first triode Q3, and a source of the third field effect transistor Q4. The other end of the first resistor R1 is coupled to a base of the first triode Q3. An emitter of the first triode Q3 is coupled to a gate of the third field effect transistor Q4. A drain of the third field effect transistor Q4 is coupled to a first output end of a second direct current power supply. An embodiment of current limiting is as follows: When a loop current of a first power supply loop is greater than a first preset threshold, if the isolation unit is damaged, the loop current of the first power supply loop flows through the first resistor R1. When a terminal potential of the first resistor R1 reaches a threshold voltage of the first triode Q3, the first triode Q3 is conducted, so that a voltage at the gate and a voltage at the source of the third field effect transistor Q4 are the same. The third field effect transistor Q4 is disconnected, to disconnect the second direct current power supply from the isolation unit (that is, disconnect the second power supply loop). Further, the first current limiting unit may further include a sixth diode D6 and a seventh diode D7. A cathode of the sixth diode D6, an anode of the sixth diode D6, and an anode of the seventh diode D7 are all coupled to the base of the first transistor Q3. A cathode of the seventh diode D7 is coupled to the emitter of the first transistor Q3. The sixth diode D6 and the seventh diode D7 are used to jointly protect the first transistor Q3 from a damage from the loop current of the first power supply loop, to improve reliability of the first current limiting unit.

FIG. 7 is a circuit diagram of a second current limiting unit according to an embodiment of this application. As shown in FIG. 7, the second current limiting unit includes a fourth field effect transistor Q5, a second resistor R2, a first comparator U1, a third resistor R3, and a ninth diode D9. A drain of the fourth field effect transistor Q5 is coupled to an input end of a second transformer. A source of the fourth field effect transistor Q5 is coupled to one end of the second resistor R2 and a negative input end of the first comparator U1. The other end of the second resistor R2 is grounded. A positive input end of the first comparator U1 is coupled to a voltage source, for example, a 5 V voltage source. An output end of the first comparator U1 is coupled to a cathode of the ninth diode D9. An anode of the ninth diode D9 is coupled to one end of the third resistor R3. The other end of the third resistor R3 is coupled to a gate of the fourth field effect transistor Q5. An embodiment of current limiting is as follows: When the loop current of the third power supply loop is greater than the second preset threshold, if the second transformer is damaged, the loop current of the third power supply loop flows through the fourth resistor Q5 and the second resistor R2. When the second resistor R2 has a greater terminal potential than the positive input end of the first comparator U1, the first comparator U1 outputs a negative voltage, and the ninth diode D9 is conducted. A voltage at the gate of the fourth field effect transistor Q5 is pulled down to a negative voltage. In this case, the source of the fourth field effect transistor Q5 has a positive voltage, the fourth field effect transistor Q5 is disconnected, and the second transformer cannot work. The alternating current conversion unit is indirectly disconnected from the second transformer. Further, the second current limiting unit further includes a second triode Q6 and a fourth resistor R6. A base of the second triode Q6 is coupled to a controller. The controller may be an alternating current conversion controller, or may be another controller, provided that the controller can control conduction of the triode. One end of the fourth resistor R6 is coupled to the base of the second triode Q6. The other end of the fourth resistor R6 is coupled to an emitter of the second triode Q6. A collector of the second triode Q6 is coupled to the gate of the fourth field effect transistor Q5. An embodiment is as follows: When the first comparator U1 outputs a negative voltage, the controller coupled to the base of the second triode Q6 controls the second triode Q6 to be conducted, a voltage at the gate of the fourth field effect transistor Q5 is zero, and the fourth field effect transistor Q5 is disconnected. In this way, it can be further ensured that the alternating current conversion unit is disconnected from the second transformer. Therefore, the following case is avoided: Voltage output of the first comparator U1 changes with a terminal potential of the second resistor R2, which causes the fourth field effect transistor Q5 to be switched between off and on. It may be understood that the second current limiting unit may further include another component, for example, a tenth diode D10, an eleventh diode D11, and a seventh resistor R7. These components are disposed for a more reliable function of the second current limiting unit, and have no impact on a specific implementation principle of the second current limiting unit. Details are not described herein.

It should be noted that, the foregoing describes representation forms of the first current limiting unit and the second current limiting unit in an example manner instead of an exhaustive manner. It should be understood that any circuit that can implement current detection and disconnect a corresponding connection relationship may be used. This is not limited in this embodiment of this application.

In addition, an embodiment of this application further provides a vehicle. The vehicle includes a power battery, a battery, a motor control module, a motor, and any power supply system described above. It may be understood that the first direct current power supply described above is the battery in the vehicle, and the second direct current power supply is the power battery in the vehicle.

It should be noted that the terms "first" and "second" are merely intended for a purpose of description, and shall not be understood as an indication or implication of relative importance.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power supply system for a motor control module, the power supply system comprising:
   a first current limiting unit and an isolation unit, wherein the isolation unit is to output a voltage to the motor control module, wherein
   the power supply system is coupled to the motor control module and at least two direct current power supplies, the at least two direct current power supplies comprise a first direct current power supply and a second direct current power supply;
   an output end of the first direct current power supply is coupled to a first input end of the isolation unit to form a first power supply loop;
   a first output end of the second direct current power supply is coupled to one end of the first current limiting unit, another end of the first current limiting unit is coupled to a second input end of the isolation unit to form a second power supply loop that is connected in parallel to the first power supply loop, and the first current limiting unit is to disconnect the second power supply loop when a loop current of the first power supply loop is greater than a first preset current threshold; and a second output end of the second direct current power supply is coupled to the motor control module to form a third power supply loop, and when the second power supply loop is disconnected, the second direct current power supply is to supply power to the motor control module using the third power supply loop.

2. The power supply system according to claim 1, further comprising an alternating current conversion unit, a first transformer, a second transformer, and a second current limiting unit, wherein
an output end of the isolation unit is coupled to an input end of the alternating current conversion unit;
an output end of the alternating current conversion unit is separately coupled to an input end of the first transformer and an input end of the second transformer, and is to: convert a direct current voltage output by the isolation unit into an alternating current voltage, and transmit the alternating current voltage separately to the first transformer and the second transformer, and the first transformer and the second transformer are to separately transmit a voltage to the motor control module; and
the input end of the second transformer is further coupled to the second current limiting unit, and the second current limiting unit is to disconnect the second transformer from the alternating current conversion unit when a loop current of the third power supply loop is greater than a second preset current threshold.

3. The power supply system according to claim 2, wherein the motor control module comprises a first pulse width modulation (PWM) generator, a second PWM generator, and an inverter, the inverter comprises a first part and a second part, each of the first and second parts comprises three insulated gate bipolar transistors (IGBTs) connected in parallel, and the three IGBTs connected in parallel in the first part are respectively connected in series to the three IGBTs connected in parallel in the second part to form a three-phase full-bridge converter; and
the first PWM generator is to control the three IGBTs connected in parallel in the first part to be conducted, and the second PWM generator is to control the three IGBTs connected in parallel in the second part to be conducted.

4. The power supply system according to claim 2, further comprising a rectifier unit, and an output end of the first transformer and an output end of the second transformer are separately coupled to the motor control module through the rectifier unit.

5. The power supply system according to claim 2, further comprising an alternating current conversion controller, to control a voltage amplitude of the alternating current voltage obtained through conversion performed by the alternating current conversion unit.

6. The power supply system according to claim 1, wherein the isolation unit comprises a first diode and a second diode, a cathode of the first diode is connected to a cathode of the second diode to form an output end of the isolation unit, the first input end of the isolation unit is an anode of the first diode, and the second input end of the isolation unit is the cathode of the second diode.

7. The power supply system according to claim 1, wherein the isolation unit comprises a first field effect transistor and a second field effect transistor, a source of the first field effect transistor is connected to a source of the second field effect transistor to form the output end of the isolation unit, the first input end of the isolation unit is a drain of the first field effect transistor, and the second input end of the isolation unit is a drain of the second field effect transistor.

8. The power supply system according to claim 1, wherein the first direct current power supply is a first battery, the second direct current power supply comprises a step-down unit and a second battery coupled to an input end of the step-down unit, a first output end of the step-down unit is coupled to the first output end of the second direct current power supply, and a second output end of the step-down unit is coupled to the second output end of the second direct current power supply.

9. The power supply system according to claim 1, wherein the power supply system further comprises a voltage regulator unit to regulate an output voltage of the isolation unit.

10. A vehicle, comprising:
a first battery, a second battery, a motor control module, a motor, and a power supply system, wherein the power supply system is coupled to the motor control module and at least two direct current power supplies, the at least two direct current power supplies comprise a first direct current power supply and a second direct current power supply, the power supply system comprises a first current limiting unit and an isolation unit, wherein the isolation unit is to output a voltage to the motor control module, wherein
an output end of the first direct current power supply is coupled to a first input end of the isolation unit to form a first power supply loop;
a first output end of the second direct current power supply is coupled to one end of the first current limiting unit, another end of the first current limiting unit is coupled to a second input end of the isolation unit to form a second power supply loop that is connected in parallel to the first power supply loop, and the first current limiting unit is to disconnect the second power supply loop when a loop current of the first power supply loop is greater than a first preset current threshold; and
a second output end of the second direct current power supply is coupled to the motor control module to form a third power supply loop, and when the second power supply loop is disconnected, the second direct current power supply is to supply power to the motor control module using the third power supply loop;
wherein the first direct current power supply comprises the first battery, and the second direct current power supply comprises the second battery.

11. The vehicle according to claim 10, wherein the power supply system further comprises an alternating current conversion unit, a first transformer, a second transformer, and a second current limiting unit, wherein
an output end of the isolation unit is coupled to an input end of the alternating current conversion unit;
an output end of the alternating current conversion unit is separately coupled to an input end of the first transformer and an input end of the second transformer, and is to: convert a direct current voltage output by the isolation unit into an alternating current voltage, and transmit the alternating current voltage separately to the first transformer and the second transformer, and the first transformer and the second transformer are to separately transmit a voltage to the motor control module; and
the input end of the second transformer is further coupled to the second current limiting unit, and the second current limiting unit is to disconnect the second transformer from the alternating current conversion unit when a loop current of the third power supply loop is greater than a second preset current threshold.

12. The vehicle according to claim 11, wherein the motor control module comprises a first pulse width modulation (PWM) generator, a second PWM generator, and an inverter that comprises a first part and a second part, each of the first and second parts comprises three insulated gate bipolar transistors (IGBTs) connected in parallel, and the three IGBTs connected in parallel in the first part are respectively connected in series to the three IGBTs connected in parallel in the second part to form a three-phase full-bridge converter; and the first PWM generator is to control the three IGBTs connected in parallel in the first part to be conducted, and the second PWM generator is to control the three IGBTs connected in parallel in the second part to be conducted.

13. A motor control module, comprising: a power supply system, wherein the power supply system comprises: a first current limiting unit and an isolation unit, wherein the isolation unit is to output a voltage to the motor control module, wherein a first input end of the isolation unit is coupled to an output end of a first direct current power supply to form a first power supply loop;

one end of the first current limiting unit is coupled to a first output end of a second direct current power supply, another end of the first current limiting unit is coupled to a second input end of the isolation unit to form a second power supply loop that is connected in parallel to the first power supply loop, and the first current limiting unit is to disconnect the second power supply loop when a loop current of the first power supply loop is greater than a first preset current threshold; and the motor control module is coupled to a second output end of the second direct current power supply to form a third power supply loop, and when the second power supply loop is disconnected, the second direct current power supply is to supply power to the motor control module using the third power supply loop.

14. The motor control module according to claim 13, wherein the power supply system further comprises an alternating current conversion unit, a first transformer, a second transformer, and a second current limiting unit, wherein an output end of the isolation unit is coupled to an input end of the alternating current conversion unit;

an output end of the alternating current conversion unit is separately coupled to an input end of the first transformer and an input end of the second transformer, and is to: convert a direct current voltage output by the isolation unit into an alternating current voltage, and transmit the alternating current voltage separately to the first transformer and the second transformer, and the first transformer and the second transformer are to separately transmit a voltage to the motor control module; and the input end of the second transformer is further coupled to the second current limiting unit, and the second current limiting unit is to disconnect the second transformer from the alternating current conversion unit when a loop current of the third power supply loop is greater than a second preset current threshold.

15. The motor control module according to claim 14, wherein the motor control module comprises a first pulse width modulation (PWM) generator, a second PWM generator, and an inverter, the inverter comprises a first part and a second part, each of the first and second parts comprises three insulated gate bipolar transistors (IGBTs) connected in parallel, and the three IGBTs connected in parallel in the first part are respectively connected in series to the three IGBTs connected in parallel in the second part to form a three-phase full-bridge converter; and the first PWM generator is to control the three IGBTs connected in parallel in the first part to be conducted, and the second PWM generator is to control the three IGBTs connected in parallel in the second part to be conducted.

16. The motor control module according to claim 14, wherein the power supply system further comprises a rectifier unit, and an output end of the first transformer and an output end of the second transformer are separately coupled to the motor control module through the rectifier unit.

17. The motor control module according to claim 14, wherein the power supply system further comprises an alternating current conversion controller, to control a voltage amplitude of the alternating current voltage obtained through conversion performed by the alternating current conversion unit.

18. The motor control module according to claim 13, wherein the isolation unit comprises a first diode and a second diode, a cathode of the first diode is connected to a cathode of the second diode to form an output end of the isolation unit, the first input end of the isolation unit is an anode of the first diode, and the second input end of the isolation unit is the cathode of the second diode.

19. The motor control module according to claim 13, wherein the isolation unit comprises a first field effect transistor and a second field effect transistor, a source of the first field effect transistor is connected to a source of the second field effect transistor to form the output end of the isolation unit, the first input end of the isolation unit is a drain of the first field effect transistor, and the second input end of the isolation unit is a drain of the second field effect transistor.

20. The motor control module according to claim 13, wherein the first direct current power supply is a first battery, the second direct current power supply comprises a step-down unit and a second battery coupled to an input end of the step-down unit, a first output end of the step-down unit is coupled to the first output end of the second direct current power supply, and a second output end of the step-down unit is coupled to the second output end of the second direct current power supply.

* * * * *